Nov. 3, 1964 A. M. BIDDISON 3,154,875
COMBINED ROD HOLDER AND HOOK SETTING DEVICE
Filed July 5, 1963
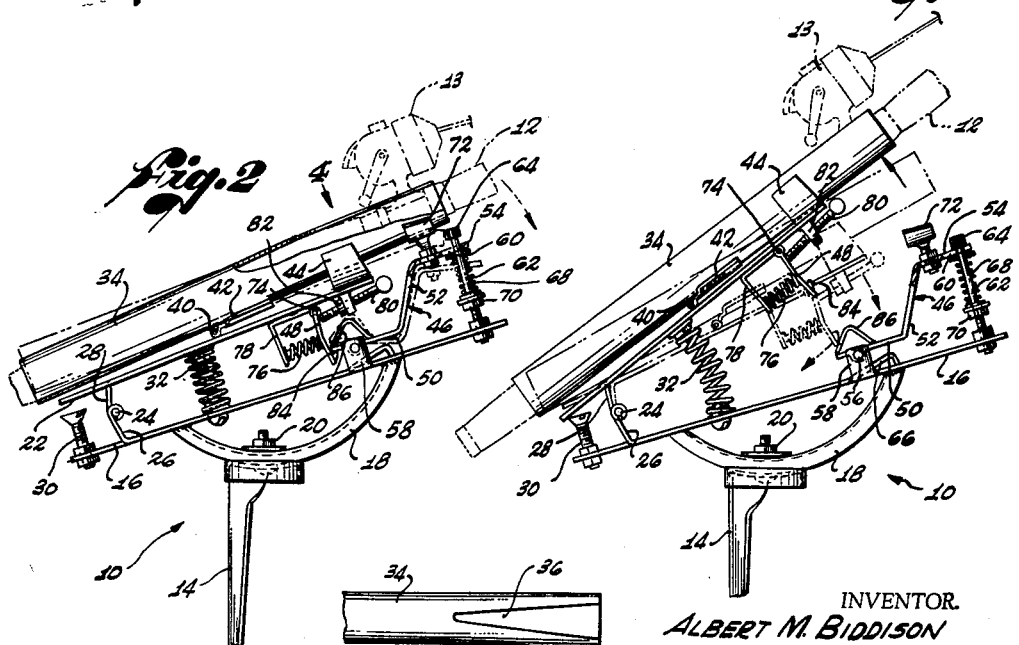
INVENTOR.
ALBERT M. BIDDISON
BY Fulwider, Patton, Rieber,
Lee, and Utecht
ATTORNEYS

United States Patent Office 3,154,875
Patented Nov. 3, 1964

3,154,875
COMBINED ROD HOLDER AND HOOK
SETTING DEVICE
Albert M. Biddison, P.O. Box 52, Chatsworth, Calif.
Filed July 5, 1963, Ser. No. 292,995
4 Claims. (Cl. 43—15)

This invention relates generally to fishing equipment and more particularly to an improved combined rod holder and hook setting device.

The purpose of such a device is to enable a fisherman to leave his rod virtually unattended and still be able to catch a fish that strikes the bait. In use, the rod being held is snapped back when the fish strikes the bait to set the hook in the same manner an experienced fisherman would do if he were holding the rod.

Prior devices of the present type have been subject to one or more significant disadvantages. In many of them, cocking involves a time consuming and complicated operation. In others, the means for tripping the latching mechanism for releasably maintaining the device in a cocked condition is incapable of being adjusted to the desired sensitivity. Thus, this last mentioned device tends to be either oversensitive, such that environmental conditions like a strong wind causes it to trip prematurely, or insensitive, such that smaller fish are not hooked. Still another disadvantage of certain prior devices is that a time consuming procedure is required in order to insert the rod and arrange it so that tripping will take place. Still other prior devices are complicated and, hence, expensive to manufacture. All of these disadvantages have contributed in very materially limiting the extent of use of this general type of device.

In view of the foregoing, it is a primary object of the invention to provide an improved combined rod holder and hook setting device which obviates the problems of the prior art.

A more specific object is to provide an improved combined rod holder and hook setting device which is self cocking, so as to enable the fisherman to quickly and easily prepare it for use.

A further object is to provide a device of the type described further characterized in that it includes sensitivity adjustment means enabling it to be accurately adjusted to trip for hooking a fish when the tension in the line reaches a desired level.

It is another object of the invention to provide a device of the type described that is capable of effective use with a wide variety of rod and reel combinations.

A still further object is to provide a combined rod holder and hook setting device of the type described which is capable of accomplishing all of the foregoing objects, yet which is relatively simple in construction and, hence, inexpensive to manufacture.

These and other objects, features, and advantages of the invention will be better understood by referring to the following detailed description taken in conjunction with the accompanying drawing in which:

FIGURE 1 is a perspective view illustrating the device of the invention in use;

FIGURE 2 is a side view, partly in elevation and partly in section, illustrating in full lines the device in its cocked position and in phantom lines the positions of certain of the parts just as release of the latching means to permit the snap action to hook the fish is about to take place;

FIGURE 3 is a side view similar to FIGURE 2 except that the device is shown in full lines in its released position and in phantom lines as it is being cocked for use; and FIGURE 4 is a fragmentary plan view taken in the direction of the arrowed line 4 in FIGURE 2.

Referring to the drawing and in particular to FIGURE 1 thereof, numeral 10 designates generally the device of the invention. It is shown in that figure holding a spinning rod 12 which, in turn, mounts a suitable reel 13. Preferably, the device is made of a light weight material which is strong and durable. Various metals as well as certain plastics have been found to be satisfactory.

In the illustrative case the device 10 embodies a support stake 14 adapted to be inserted generally vertically into the ground at the desired location. Such support means would be used in instances where a fisherman is fishing from the shore in a lake or other body of water. In other types of applications, as for example, where the device is intended to be used on a boat, the stake 14 would of course be replaced with other suitable support means.

Secured to the upper end of the stake 14 is an elongated base member 16 which mounts various movable parts of the device. Preferably, in order that the initial position of the rod 12 may be adjusted to any desired angle with respect to horizontal the base member 16 is adjustably secured to the stake 14 for limited tilting. Mounting is achieved by an arcuate shaped bracket 18 fixed to the underside of the base member 16 and which in turn is held in place relative to the stake 14 by a nut and bolt assembly 20. As illustrated in FIGURE 1, the bracket 18 is slotted along its length to permit it to abut the stake at any desired location along its length, and, hence, to permit such tilting of the base member 16. Adjustment is carried out by loosening the nut of the assembly 20, shifting the bracket 18 to abut the stake at a different location, and then retightening the nut.

Pivotally mounted on the base member 16 at a location spaced thereabove is an elongated support member 22 conforming generally in shape to the base member 16 but being slightly shorter. Such mounting is accomplished here by a hinge 24 secured to brackets 26 and 28 projecting upwardly and downwardly, respectively, from the members 16 and 22 adjacent their rearward ends. For convenience of manufacture, the brackets 26 and 28 are shown as comprising bent portions of the members.

When so mounted the support plate 22 is pivotal about a horizontal axis between a cocked position (FIGURE 2), wherein it is positioned generally parallel to the base member 16, and a released position (FIGURE 3), wherein it is tilted upwardly at its forward end. The released position is established by a stop comprising a screw 30 joined to the base member 16 and projecting upwardly therefrom at its rearward end. On the other hand, the cocked position of the pivotal support plate 22 is established by latching means for holding that member in its cocked position, as will be described in detail below.

The support plate is yieldably urged to its released position by a compression spring 32 positioned between the members 16 and 22 and secured at its opposite ends to them. The spring 32 is of sufficient strength that when the support plate 22 is released from its cocked position, it rapidly springs or snaps to its released position.

Carried by the support plate 22 is an elongated tube 34 that functions as means for holding the rod 12. Referring to FIGURE 4, it may be seen that the tube 34 tapers slightly inwardly from front to rear so as to be capable of receiving in tight fitting engagement the handles of various types and sizes of rods. It will be appreciated that the diameter of the rod handle governs the extent to which it is disposed in the tube 34. Preferably, a slot 36 is provided at the forward end of the tube 34, as illustrated in FIGURE 4, in order to receive the mounting flange of the reel 13.

An important feature of the present device, as will be discussed more fully below, is that the latching means automatically engage as the support member 22 is moved to its cocked position. Such self-cocking is aided by virtue of the holder tube 34 being pivotally mounted on the member 22. Pivotal connection in this instance is by a hinge 40 secured to the upper surface of the member 22, and to the underside of the tube 34 by a bracket 42. This pivotal connection is preferably located at a position spaced forwardly of the connection of the members 16 and 22, and, in the illustrative case, is located in the central regions of the member 22 and the tube 34. Since the tube 34 is located just slightly above the plate 22, its relative pivoting is over a relatively small angle about a horizontal axis parallel to the axis of the hinge 24.

For the purpose of supporting the tube 34 against lateral movement relative to the support member 22, a semi-cylindrical bracket 44 is provided on the forward end of the support member. As may be seen, the bracket 44 functions as a cradle, receiving the forward end portion of the tube 34.

As previously stated, it is a highly desirable feature of a device of the present type that it be self-cocking, or in other words that the latching means automatically engage when it is cocked. Further, it is desired that the latching means be readily adjustable so that various rod and reel combinations may be accommodated and so that a force of a predetermined adjusted level on the rod will cause tripping of the device. To this end, the present latching means comprises basically a pivotal arm 46 mounted on the member 16 and a cooperating pivotal keeper 48 mounted on the member 22. It will be appreciated that the relative positions of the arm 46 and keeper 48 could be reversed without impairing the function of the device.

The latching arm 46 comprises a stepped member, including a rearward section 50, an intermediate section 52 bent upwardly relative to the former, and a forward section 54 oriented substantially parallel to the rearward section 50. Pivotal mounting of the arm 46 is achieved by a hinge 56 supported by brackets 58 projecting upwardly from the base member 16. The hinge 56, in turn, is arranged with its axis parallel to axes of hinges 24 and 40, and connected to the rearward section 50 of the arm. The forward section 54 of the arm is slotted at 60 for receiving a guide post 62 projecting upwardly from the base member. Movement of the arm 46 is between latching and released positions, shown in full and phantom lines, respectively, in FIGURE 2.

It may be seen that movement of the arm 46 is limited in the upward direction by the head 64 on the guide post 62 and in the downward direction by a stop 66 formed on the member 16.

The arm 46 is spring biased toward its latching position by a compression spring 68 disposed on the guide post 62 and engaging the forward section 54 of the arm 46 at its upper end and a threaded adjustment nut 70 at its lower end. Adjustment of the spring compression and, hence, the force required to move the latching arm 46 toward its released position is achieved by simply running the nut 70 up and down on the guide post 62.

The forward section 54 of the arm 46 mounts an actuator or trigger 72, shaped like a cradle, for engaging and supporting the forward end portion of the tube 34 when the support member 22 is in its cocked position. As may be seen in FIGURE 2, in this condition the tube 34 is tilted upwardly at its forward end away from the support member 22 because of the relative vertical position of the trigger 72. Therefore, when the tube 34 is forced downwardly, as when a fish strikes the bait, movement is resisted only by the relatively weak spring 68 acting on the arm 46.

The keeper 48 is pivotally mounted on the underside of the member 22 by a hinge 74 arranged with its pivotal axis horizontal and parallel to the other hinge axes. In order that the keeper 48 will cooperate with the latching arm 46 to achieve latching, it is arranged in the illustrative case to project in its operative position generally perpendicularly from the support member 22. A spring 76 supported between the rearward side of the keeper 48 and a bracket 78 secured to the member 22 yieldably restrains rearward pivoting of the keeper. Conversely, a thumb screw 80 supported by a bracket 82 on the underside of the member 22 limits forward pivoting of the keeper and enables its initial position to be adjustably established.

A wedge-like projection 84 formed on the lower end of the keeper 48 affords an upwardly facing stop shoulder which engages beneath the rearward end of the arm 46 to achieve latching. As illustrated in full lines in FIGURE 2, when the support member 22 is in its cocked position and the arm 46 is in its latching position (FIGURE 2), the rearward end of the arm 46 and the keeper 48 are so engaged. It will be appreciated that the downward force on the tube required to pivot the arm 46 to its released position, illustrated in phantom lines in FIGURE 2, is controlled in part by the adjusted position of the keeper 48. As the thumb screw 80 is backed off to enable the keeper 48 to assume an initial position pivoted counterclockwise from its position in the drawings, then a greater force on the trigger 72 would be required to achieve release. On the other hand, if the initial position of the keeper were adjusted clockwise from the position in the drawing, the converse would be true.

For the purpose of insuring that the latching means smoothly engages when the support member 22 is pivoted to its cocked position, a triangularly shaped section 86 is provided at the rearward end of the arm 46. This section affords a ramp or cam surface that engages the lower end of the keeper 48 during the cocking operation in the manner illustrated in phantom lines in FIGURE 3. When such engagement takes place, the keeper 48 is cammed rearwardly against the biasing force of its spring 76 until the stop shoulder on the projection 84 drops below the rearward end of the arm 46. The keeper 48 then springs back to its initial position established by the thumb screw 80.

In preparing the device for use, the thumb screw 80 is normally adjusted so as to position the keeper 48 to accommodate a rod and reel combination of a given size and weight. Once this primary adjustment is made experience has shown that further finer adjustments, as are often necessitated by factors such as wind conditions, may be advantageously made with the nut 70 on the guide post 62. In this connection, should a greater or lighter force on the rod be desired to release the latching means, then the nut 70 is turned up or down on the guide post to alter the initial compression of the spring 68. Adjustment of the angular position in which the rod 12 is to be held is made by tilting the base member 16 relative to the stake 14 in the manner described above.

In use, the stake 14 is simply inserted into the ground generally vertically in the manner shown in FIGURE 1, and the device is then cocked. To achieve cocking, it is convenient for the fisherman to grip the device rearwardly of the hinge 40 connecting the support member and tube 34 and clamp the members 16 and 22 together. By gripping the device in this position, the tube 34 is tilted to the phantom line position of FIGURE 3 where it rests against the rearward portion of the support member 22. Accordingly, it is spaced above the normal position of the trigger and positive latching upon release of the clamping force is thereby insured.

The fisherman then normally casts the bait out in the usual manner, holding the rod in his hands while doing so. The rod handle is next inserted into the holder tube 34 to the position shown in FIGURE 1 and the reel 13 is actuated to insure that any slack in the line is taken up. In inserting the rod 12, it may be necessary to tilt the holder tube 34 slightly relative to the support plate to insure against accidental tripping the device. Alternately, it is, of course, possible to insert the rod handle into the tube before cocking.

When the fish strikes the bait, sufficient tension is drawn on the line to apply slight downward force to the rod 12. Depending upon the adjustments of the thumb screw 80 controlling the position of the keeper and of the nut 70 controlling the compression of the spring, the latching arm 46 is pivoted downwardly to the phantom line or released position of FIGURE 2. This, in turn, causes the rearward end of the arm 46 to pivot upwardly and away from the keeper 48 in such a manner as to clear the stop shoulder afforded by the wedge-like projection 84. When this takes place, the main spring 32 immediately snaps the rod upwardly to the released position of FIGURE 3, applying tension to the line so as to hook the fish.

It will be appreciated from the foregoing that the device comprises simple and effective means for holding the rod and hooking a fish that strikes the bait. It is compact and, therefore, easily transported, and, at the same time, adapted for convenient storing when not in use. Adjustments in sensitivity may be quickly and easily made in order to accommodate a wide variety of rod and reel combinations, as well as to accommodate varying environmental conditions, such as weather and the like. Moreover, it is significant to note that cocking is achieved by simply pivoting the support member 22 downward to its cocked position, the latching means automatically engaging. Further, by virtue of the pivotal mounting of the support tube, there is no tendency for the device to unlatch when the clamping force used to cock it is released.

Although one embodiment of the invention has been illustrated and described in considerable detail, it will be understood that this was only by way of illustration and that various changes in the constructions and arrangements at the various parts may be made without departing from the spirit and scope of the invention.

I claim:

1. A combined rod holder and hook setting device, comprising:

elongated support means;

a base member having forward and rearward ends and secured to the upper end of said means;

a support member pivotally mounted on said base member at a location vertically spaced thereabove, said support member being pivotal about an axis between cocked position wherein it is adjacent and generally parallel to said base member and released position wherein its forward end is tilted upwardly relative to said base member;

spring means on said members yieldably urging said support members to its released position;

holder means adapted to removably receive the handle of a rod to support the same, said means being pivotally mounted on said support member for limited angular movement about a pivotal axis oriented substantially parallel to and located forwardly of the pivotal axis of said support member;

a latching arm mounted on said base member intermediate said base and support members for movement between latching and released positions, said arm being spring biased toward its latching position;

a keeper mounted on said support member and engageable with said latching arm in the latching position thereof to releasably retain said support member in its cocked position, said keeper being automatically engaged with said latching arm when said support member is pivoted to its cocked position against the biasing force of said spring means;

and a trigger on said latching arm adapted to engage said holder means, said trigger being responsive to downward pivoting of the forward end of said holder means relative to said support member to move said latching arm to its released position and thereby release said support member for movement to its released position under the action of said spring means.

2. A combined rod holder and hook setting device, comprising:

support means adapted to be oriented generally vertically;

a base member having forward and rearward ends and adjustably secured on the upper end of said support means, said base member being adapted to be arranged in positions of angular tilt with respect to horizontal;

a support member having forward and rearward ends and pivotally mounted on said base member at a location vertically spaced thereabove and adjacent the rearward ends of said members, said support member being pivotal about an axis between a cocked position wherein it is oriented generally parallel to said base member and a released position wherein it is tilted upwardly relative to said base member;

first spring means on said members yieldably urging said support member to its released position;

holder means adapted to removably receive the handle of a rod, said holder means being pivotally mounted on said support member at a location spaced forwardly of the pivotal connection of said members and arranged for limited angular movement about a pivotal axis oriented substantially parallel to the pivotal axis of said support member;

a latching arm mounted on said base member intermediate said base and support members for movement between latching and released positions;

second spring means biasing said latching arm to its latching position;

a keeper mounted on said support member and engageable in its operative position with said latching arm in the latching position thereof to releasably retain said support member in its cocked position;

a cam surface on one of said latching arms and keeper for guiding said keeper into such engagement with said arm upon movement of said support member to its cocked position;

and a trigger on said latching arm adapted to engage said holder means at a location spaced forwardly of its pivotal axis, said trigger being responsive to downward pivoting of said holder means to move said latching arm to its released position and thereby free said support member for movement to its released position.

3. The subject matter of claim 2 including means for adjustably establishing the biasing force of said second spring means.

4. The subject matter of claim 2 wherein said keeper is adjustably mounted on said support member and including means on said support member engageable with said keeper for adjustably establishing the operative position of said keeper.

References Cited in the file of this patent

UNITED STATES PATENTS

| | | |
|---|---|---|
| 693,071 | Ruud | Feb. 11, 1902 |
| 3,058,251 | Brooks | Oct. 16, 1962 |